April 5, 1932.  A. F. GIESE, JR  1,852,560
MUD GUN
Filed May 7, 1930  2 Sheets-Sheet 1
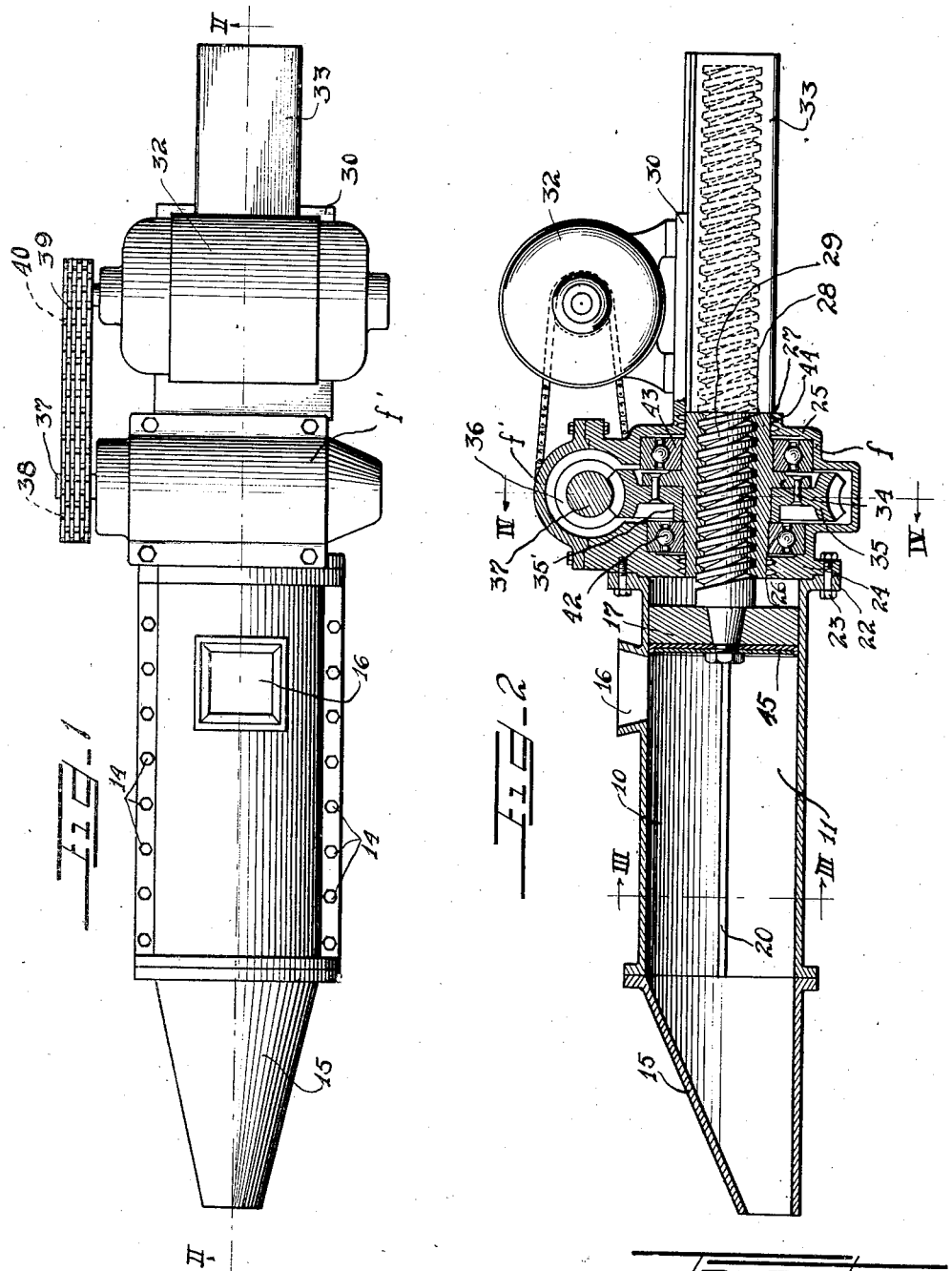
Inventor
August J. Giese Jr.
by Charles H. Hill Attys.

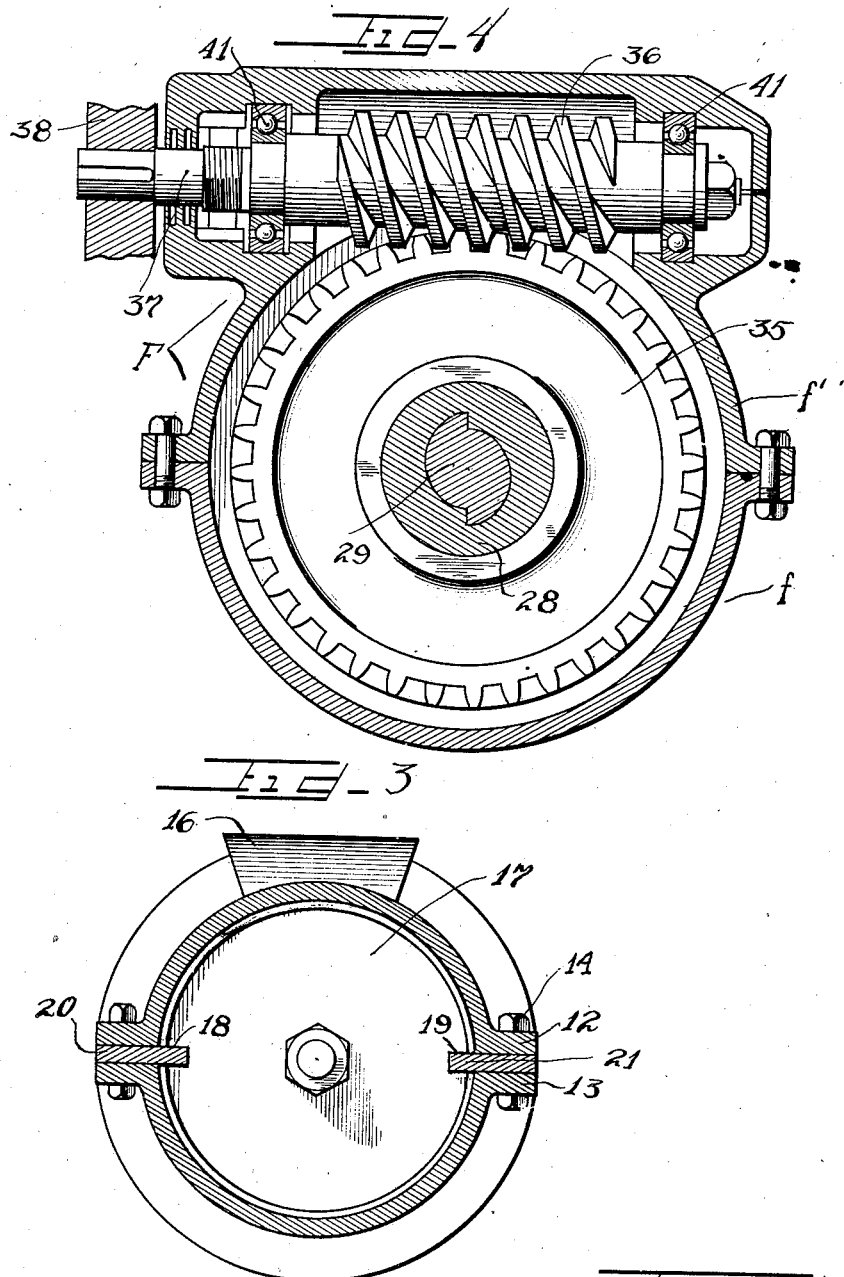

Patented Apr. 5, 1932

1,852,560

UNITED STATES PATENT OFFICE

AUGUST F. GIESE, JR., OF GARY, INDIANA

MUD GUN

Application filed May 7, 1930. Serial No. 450,373.

My invention relates to mud or clay guns which are particularly applicable and useful for plugging up tapping holes of blast furnaces to shut off the flow of molten metal therefrom.

The invention concerns particularly that type of gun in which a plunger is powerfully shifted along a barrel to eject clay from a nozzle at the barrel end. The general object of the invention is to provide improved means for powerfully and efficiently shifting the piston in the cylinder.

More in detail, an important object of the invention is to provide a screw shaft for effecting the slow and powerful reciprocation of the piston.

A further object is to restrict the screw shaft to longitudinal movement and to cause such movement by the engagement with the screw shaft of a screw nut rotated through a train of gearing by a driving motor, preferably an electric motor.

Another object is to provide an arrangement in which the screw shaft is longitudinally reciprocated by means of a screw nut secured to a worm wheel which is rotated by a worm driven by the driving motor.

Still a further object is to provide an arrangement for keeping the piston accurately centered within the cylinder independently of the engagement of the piston with the cylinder wall in order to reduce friction and wear of the piston and cylinder.

Still a further object is to provide guides in the cylinder for preventing the piston from turning therein, and to rigidly connect the screw shaft with the piston so that the screw shaft will be restricted to longitudinal movement.

Still another object is to provide compact construction and arrangement of the driving train between the driving motor and the screw shaft.

The above enumerated and other features of my invention are incorporated in the structure disclosed on the drawings, in which drawings, Figure 1 is a plan view of the gun structure;

Figure 2 is a side elevation partly in vertical diametrical section;

Figure 3 is an enlarged section on plane III—III of Figure 2; and

Figure 4 is a section on plane IV—IV of Figure 2.

The barrel of the gun structure shown comprises upper and lower semi-cylindrical sections 10 and 11 secured together by means of side flanges 12 and 13 and bolts 14. Secured to the outer end of the barrel or cylinder structure is the discharge nozzle 15. Near its inner end, the cylinder has the hopper entrance or opening 16 for charging clay into the cylinder.

Within the cylinder is the piston 17 having the diametrically opposite radial slots 18 and 19 for receiving steel guide bars 20 and 21 secured between the flanges 12 and 13 of the cylinder halves, the purpose of the guide bars being to keep the piston centered within the cylinder independently of the cylinder walls, and also to prevent turning of the piston in the cylinder during reciprocation thereof.

At its inner end the cylinder has the flange 22 to which is detachably secured by means of bolts 23 the inner wall 24 of a frame F which houses a driving train to be described later. The wall 24 and the outer wall 25 of the frame F have aligned openings 26 and 27 for receiving a screw nut 28 which meshes with the screw shaft 29 extending therethrough and rigidly secured at its inner end to the piston. The frame F supports a platform 30 on which is mounted an electric motor 32. The base has a housing 33 secured thereto for receiving the screw shaft, so that this shaft is at all times enclosed and protected.

The screw nut 28 has a circumferential radially extending flange 34 to which is secured a worm wheel 35. The worm wheel is engaged by a worm 36 journalled in the upper part of the frame F, the worm shaft 37 projecting to the outside of the frame and carrying a belt or sprocket pulley 38 which is connected by a suitable belt 39 with the driving pinion 40 on the shaft of the driving motor 32. With the arrangement shown, when the motor operates, the screw shaft will be powerfully shifted longitudinally to move the piston, the guide bars 18 and 19 preventing turning of the piston and of the screw shaft which is rigidly secured thereto. The screw threading is preferably multiple and of the desired lead.

To reduce friction, the worm shaft 37 may be journalled in ball bearings 41. To reduce the bearing friction of the screw nut 28, ball bearing structures 42 and 43 are inserted in the frame. The bearing structure 42 engages between the wall 24 of the hub 35' of the worm wheel 35, while the bearing structure 43 engages between the wall 25 and the flange 34 on the screw nut, so that the ball bearing structures will take up the end thrust of the screw nut when it is rotated to reciprocate the screw shaft. To permit ready assembly of the various parts, the lower and upper sections f and f' of the frame F are detachable, as clearly shown in Figure 4. The frame F will be securely closed so that it may serve as an oil well, and, in the walls 24 and 25 surrounding the screw nut, oil grooves 44 are preferably provided.

To prevent leakage of clay past the piston as it is being powerfully shifted outwardly to eject the clay, I preferably provide a cup washer 45 which may be of asbestos or other suitable material.

Briefly describing the operation, the piston is normally at the inner end of the cylinder behind the charging opening 16, and a charge of clay is introduced into the cylinder. The motor is then started and, through the worm and the worm wheel, the screw nut 28 will be slowly and powerfully rotated in mesh with and around the screw shaft which is held against rotation by its secure engagement with the piston which is locked by the bars 18 and 19 against rotation. As the screw nut turns, the shaft will be shifted longitudinally inwardly to shift the piston through the cylinder and to eject the clay out of the gun nozzle. As the piston is shifted it rides on the guide bars and is kept centered relative to the cylinder independently of engagement with the cylinder wall, and the piston is kept from riding on the bottom of the cylinder so that both the piston and cylinder are protected against wear, the wear being taken up entirely by the engaging surfaces of the piston and guide bars. The cup washer 45 on the piston will clean the piston wall in advance of the piston, so that, when the piston is retracted, no clay will be carried to reach the screw shaft, and this shaft and its driving screw will always be kept clean.

It will be noted that, as soon as current is withdrawn from the motor, it will be rapidly stopped by the resistance of the driving train. The driving train then forms a double lock for preventing the piston from being pushed back by the pressure within the furnace to which the gun is applied. The need of braking mechanism for the motor is thus eliminated. Practically as soon as current is withdrawn from the motor, the piston will be rigidly locked by the gearing train against further movement.

As the electrical circuit control for the motor forms no part of this present invention I have not shown it, but it is understood that, in practice, current flow controlling means such as rheostats and switches will be provided and also limit switch structure for controlling the motor circuit to stop the motor when the piston reaches the ends of its strokes in the cylinder.

The arrangement disclosed comprising a screw nut driven by a worm wheel and worm train and rotating on the screw shaft, produces a powerful, efficient and quiet driving arrangement, all the driving parts being compactly arranged within an enclosing housing and being protected and kept clean.

As changes and modifications may be made in the construction, arrangement and operation, I do not desire to be limited except as will appear in the appended claims.

I claim as follows:

1. In a clay gun, the combination of a cylinder, a piston reciprocable within said cylinder, means including a screw shaft for reciprocating said piston, and cooperating means on said piston and cylinder for guiding said piston independently of the cylinder wall and free of contact with the cylinder wall.

2. In a clay gun, the combination of a cylinder, a piston reciprocable within the cylinder, a housing secured to said cylinder, a screw shaft extending through said housing and secured to said piston, a screw sleeve journalled in said housing and receiving said screw shaft, a worm wheel secured to said screw sleeve, a worm shaft journalled in said housing and having a worm thereon engaging said worm wheel, an extension on said housing, a driving motor mounted on said extension, and a driving connection between said motor and said worm shaft whereby when said motor is operated said screw shaft will be shifted axially to move said piston through said cylinder, and means for preventing rotation of said screw shaft.

3. In a clay gun, including a cylinder and a piston therein for discharging clay and the like from said gun, means for reciprocating said clay gun piston in said cylinder including a screw shaft and a member for threading said shaft back and forth in said cylinder.

4. In a clay gun, including a cylinder and a piston therein for discharging clay and the like from said gun, means for reciprocating said clay gun piston in said cylinder including a screw shaft and a member for threading said shaft back and forth in said cylinder, said member comprising a screw nut disposed about and in mesh with the thread of said screw shaft to cause longitudinal movement of said screw shaft and piston.

5. In a clay gun, including a cylinder and a piston therein for discharging clay and the like from said gun, means for reciprocating said clay gun piston in said cylinder including a screw shaft, a member for threading said shaft back and forth in said cylinder, a worm wheel connected to said member, a worm in engagement with said worm wheel, and a power actuated device for rotating said worm to cause longitudinal movement of said screw shaft and piston.

6. A clay gun comprising a cylinder, an electric motor mounted on said cylinder, and screw-like means in said cylinder driven by said motor for advancing clay through said gun and out of the discharge end of the gun.

In testimony whereof I have hereunto subscribed my name at Gary, Lake County, Indiana.

AUGUST F. GIESE, Jr.